US005988877A

United States Patent [19]

Hochrad et al.

[11] Patent Number: 5,988,877

[45] Date of Patent: *Nov. 23, 1999

[54] METHOD AND APPARATUS FOR TEMPERATURE CALIBRATION IN MICROWAVE ASSISTED CHEMISTRY

[75] Inventors: Todd Mark Hochrad, Ventura, Calif.; William Edward Jennings, Wingate; Edward Earl King, Charlotte, both of N.C.

[73] Assignee: C E M Corporation, Matthews, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/929,932

[22] Filed: Sep. 15, 1997

[51] Int. Cl.[6] .............................. G01K 13/10; H05B 6/64

[52] U.S. Cl. .......................... 374/150; 374/149; 374/110; 219/759

[58] Field of Search .................................... 374/110, 150, 374/149; 219/710, 759, 711

[56] References Cited

U.S. PATENT DOCUMENTS

| | | | |
|---|---|---|---|
| Re. 34,373 | 9/1993 | Collins et al. . | |
| 4,471,193 | 9/1984 | Walter | 374/110 |
| 4,682,898 | 7/1987 | Janssen . | |
| 4,882,286 | 11/1989 | Neas et al. . | |
| 5,066,843 | 11/1991 | Revesv . | |
| 5,152,609 | 10/1992 | Hader et al. | 374/110 |
| 5,206,479 | 4/1993 | Zakaria et al. . | |
| 5,318,754 | 6/1994 | Collins et al. | 219/710 |
| 5,320,804 | 6/1994 | Zakaria et al. | 422/21 |
| 5,369,034 | 11/1994 | Hargett et al. . | |
| 5,427,741 | 6/1995 | Bennett . | |
| 5,443,795 | 8/1995 | Revesv . | |
| 5,447,374 | 9/1995 | Fraser et al. | 422/21 |
| 5,459,302 | 10/1995 | Jacqualt | 374/149 |
| 5,520,886 | 5/1996 | Bennett et al. . | |

FOREIGN PATENT DOCUMENTS

| | | |
|---|---|---|
| 0455513 | 11/1991 | European Pat. Off. . |
| 2444856 | 4/1976 | Germany . |
| 2715738 | 11/1977 | Germany . |

OTHER PUBLICATIONS

"Comparison of Microwave Assisted and Convention Leaching Using EPA Method 3050B," ElkeM. L. Lorentzen and H. M. "Skip" Kingston, Analytical Chemistry, vol. 68, No. 24, pp. 4316–4320, 1996.

*Primary Examiner*—Christopher W. Fulton
*Assistant Examiner*—Quyen Doan
*Attorney, Agent, or Firm*—Philip Summa, Patent Attorney

[57] ABSTRACT

A method and apparatus are disclosed for externally and noninvasively determining the temperatures of chemical reactions inside a plurality of separate closed vessels that are made of materials that substantially transparent to microwave radiation but that are poor conductors of heat. The method comprises exposing a plurality of substantially microwave-transparent of vessels containing chemical reagents therein to microwave radiation, concurrently measuring the temperature of the reagents inside a first vessel using a first temperature sensor inside the first vessel and while measuring the temperature of the exterior of the first vessel using a second temperature sensor positioned externally to the first vessel, and immediately thereafter successively measuring the temperature of the exterior of the remainder of the vessels using the second sensor.

25 Claims, 1 Drawing Sheet

10 25 20 22 23 24 11 20 12 16 27 30

SOURCE WAVEGUIDE CONTROLLER 20 21 12(VESSELS) 14(TEMPERATURE SENSOR) 13 (VESSEL) 16 15 (TEMPERATURE SENSOR)

METHOD AND APPARATUS FOR TEMPERATURE CALIBRATION IN MICROWAVE ASSISTED CHEMISTRY

FIELD OF THE INVENTION

The present invention relates to microwave assisted chemistry techniques and apparatus, and in particular, relates to the external and noninvasive measurement and calibration of temperatures inside closed vessels while chemical reactions inside those vessels are being exposed to microwave radiation.

BACKGROUND OF THE INVENTION

The term "microwave assisted chemistry" refers to the use of electromagnetic radiation within the microwave frequencies to provide the energy required to initiate, drive, or accelerate certain chemical reactions. As chemists have long been aware, the application of heat energy is one of the most significant factors in increasing the rate of a wide variety of chemical reactions. Thus, generally familiar devices such as the Bunsen burner, other types of gas burners, hot plates, and other similar devices have historically been used to initiate or accelerate various chemical reactions.

As a relatively crude comparison, microwave assisted chemistry techniques are used to heat chemical reagents in the same way that a consumer microwave oven cooks food. There are significant differences, however, between the ordinary consumer use of microwave energy with food and its laboratory use with chemical reagents. Thus, the devices and techniques required for microwave assisted chemistry are generally much more sophisticated than are the consumer-oriented devices and techniques.

In one comparison, however, a laboratory microwave device and a consumer microwave offer the same advantage: in many circumstances they both greatly increase the rate at which materials can be heated as compared to the rates that they could be heated by ordinary conduction or convection heating. Thus, microwave assisted chemistry has been particularly valuable in driving or accelerating reactions that tend to be time-consuming under more conventional heating techniques. Particular examples include moisture analysis, in which samples must effectively be heated to dryness; digestion, a process in which a chemical composition is broken down into its elements for further analysis, with the breakdown generally being accomplished by heating the composition in one or more mineral acids; and the Kjeldahl techniques for nitrogen determination. Using conventional heating techniques, moisture analysis, Kjeldahl, or digestion reactions can be very lengthy, extending for hours in some cases. When the reactions are microwave assisted, however, they can be completed in a much shorter period of time. It will be understood that this time savings has a particularly significant advantage in any situation in which large number of samples must be tested on an almost continuous basis. Thus, although microwave assisted chemistry is relatively new compared to some other techniques, it has become well established and accepted in a number of analytical applications.

As well understood by those familiar with the electromagnetic spectrum, the term "microwave" is often used generically to refer to radiation with wavelengths of between about 1000 and 500,000 microns ($\mu$), and corresponding frequencies of between about $1\times10^9$ and $5\times10^{11}$ Hertz (Hz). These are arbitrary boundaries, however, and other sources refer to microwaves as having frequencies of between about $10^8$ Hz and $10^{12}$ Hz and wavelengths of between about 300 centimeters (cm) and 0.3 millimeters (mm). For commercial and consumer purposes in the United States, the available microwave frequencies are regulated by the Federal Communications Commission and are generally limited to selected frequencies. Because of the relatively long wavelength of microwave radiation, microwave assisted chemistry techniques are often carried out in closed vessels which are in turn placed inside a device that bears a superficial relation to a consumer microwave oven, but that is much more sophisticated in its source, waveguide, cavity, and control elements.

Although the simple application of microwave energy to devices in sealed vessels has some advantages, the technique becomes particularly useful when the reactions inside the vessels can be monitored while microwaves are being applied. Thus, in a typical microwave assisted chemistry system, a plurality of similar reactions are carried out at the same time in separate closed vessels that are placed together in a single cavity and then concurrently exposed to microwaves from a single source. Typically, one of the vessels carries temperature and pressure measuring devices. This "sensor vessel" is monitored and the conditions therein are assumed to be representative of the conditions in the remainder of the vessels to which microwaves are being applied.

Stated differently, in certain microwave assisted systems, a group of reaction vessels (typically six or eight) is placed into the microwave device at the same time, and often on a turntable that rotates as the microwaves are being applied. As noted above the wavelength of microwaves is typically larger than the items being heated, so that stationary items are not always evenly exposed to the microwaves. Accordingly, smaller items such as reaction vessels and relatively small amounts of chemical reagents are best moved on a periodic basis while being exposed to the microwaves. For similar reasons, consumer kitchen microwave ovens typically include fan-like stirrers to more evenly reflect microwaves within a cavity, or turntables for rotating food as it cooks. Alternatively, microwave cooking instructions typically tell the consumer to turn, stir, or otherwise move the food during the cooking process.

By monitoring the temperature and pressure of the sensor vessel, the application of microwave power, either in terms of energy level or time, can be adjusted on a regular basis based on the feedback from the sensor vessel. Because in typical applications a plurality of vessels are rotating on a turntable, however, attempting to monitor every single reaction vessel becomes at least unwieldy, or at worst impossible. Thus, if the reaction inside one of the unmonitored vessels differs significantly from the reaction inside the monitored vessel, the reaction in one or more of the unmonitored vessels can proceed in quite undesirable fashion. As a result, the reactions in the unmonitored vessels can proceed either too far or not far enough to accomplish their intended purpose. Such results can significantly reduce the advantages of the microwave assisted technique.

An ideal method of measuring the temperature of ongoing chemical reactions in a plurality of separate vessels is to attempt to place a high-quality temperature sensor such as a thermocouple in each vessel and connect all of the thermocouples to appropriate electronic circuitry and memory that can convert the thermocouple signal into a temperature reading.

To date, however, individual temperature measurement from inside the vessels has remained somewhat unwieldy for several reasons including the movement of the vessels in the cavity, for example on a turntable as noted above. This movement greatly increases the complexity of physical connections between the individual moving vessels and the remaining stationary portions of the device.

Furthermore, in microwave assisted techniques, external temperature measurement also presents certain problems. In particular, the reaction vessels used in microwave assisted chemistry, particularly closed reaction vessels, must be formed of materials that are transparent to microwave radiation, resistant to chemical attack, and strong enough to withstand high internal gas pressures. Typically, the vessels are formed from certain types of engineering polymers that offer these properties. Although the microwave transparency of such materials is a great advantage, such polymers tend to have relatively poor heat conductivity and instead act as insulators. Thus, as opposed to vessels intended for external temperature measurement (such as the stainless steel "bomb" of a calorimeter), the external temperature of vessels for microwave assisted chemistry tend to differ widely from the actual internal temperature. Although some of these polymer materials will eventually reach an equilibrium temperature with their contents, the time required to reach such equilibrium temperature ("lag time") can be longer than the progress of many chemical reactions taking place under microwave assistance. Thus, the temperature feedback from the exterior of a microwave assisted chemistry vessel is often unsatisfactory for analytical or control purposes.

Additionally, external measurements carried out by radiometric techniques can be affected by the changes in thermal emission properties of the vessel material that follow a change in temperature. Stated differently, for some materials the change in the black body radiation they emit does not linearly follow the change in temperature. These nonlinear relationships can add to the complexity of external temperature measurement.

OBJECT AND SUMMARY OF THE INVENTION

Accordingly, there exists a need for an apparatus and method that can externally and noninvasively determine the reaction temperature inside of a closed reaction vessel during microwave assisted processes, particularly a vessel that is formed of a material with poor heat conductivity.

The invention meets this object with a method and apparatus for externally determining the temperatures of chemical reactions inside two separate closed vessels that are typically made of materials that are poor conductors of heat. The method comprises heating two separate vessels containing chemical reagents therein; concurrently measuring the temperature of the reagents inside the first of the two vessels using a first temperature sensor inside the first vessel and while measuring the temperature of the exterior of the first vessel using a second temperature sensor positioned externally to the first vessel; and immediately thereafter measuring the temperature of the exterior of the second vessel using the second sensor.

In another aspect, the invention comprises re-measuring the inside and exterior temperatures of the first vessel after measuring the exterior of the second vessel and immediately thereafter re-measuring the exterior temperature of the second vessel.

In another aspect, the invention comprises successively measuring the temperature of the exterior of a plurality of vessels following the measurement of the temperature inside and outside of the first vessel.

In another aspect, the invention comprises a system for externally determining the interior temperatures of a plurality of closed vessels that comprises a microwave source, a waveguide in communication with the source, a resonator in communication with the waveguide, a plurality of reactions vessels in the resonator in which the vessels are formed of a material that is substantially transparent to microwave radiation, but typically a poor heat conductor; a first temperature sensor inside one of the reaction vessels; a second temperature sensor adjacent the resonator, and means for repeatedly and successively presenting the exteriors of the first temperature sensor vessel and the remaining vessels to the second temperature sensor.

The foregoing and other objects and advantages of the invention will become clearer when taken in consideration with the accompanying detailed description and in light of the drawings in which:

DETAILED DESCRIPTION OF THE PREFERRED EMBODIMENTS

The present invention is a method and apparatus for externally and noninvasively determining the temperatures of chemical reactions inside two or more separate closed vessels in which the vessels are made of materials that are substantially transparent to microwave radiation, but are generally poor conductors of heat.

Figure 1:
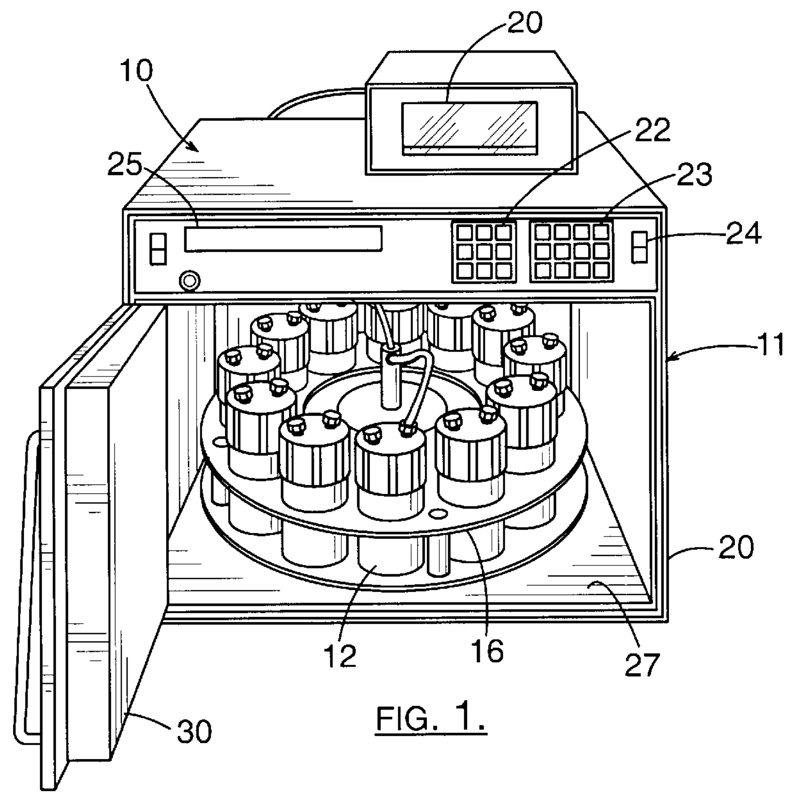
FIG. 1 is a perspective view of a microwave assisted chemistry system according to the present invention.

FIG. 1 is a perspective view of a typical device for microwave assisted chemistry. The overall device is generally designated at 10, and exemplary devices are available from the assignee of the present invention, CEM Corporation of Matthews, N.C. Devices such as the illustrated device 10 are used for extraction, digestion, drying, ashing, and a number of other chemical processes. The principles behind their operation and use are generally well understood and will not be discussed in detail herein other than to explain the claimed invention.

Such devices are also discussed in a number of U.S. patents which are commonly assigned with the present invention, and these include U.S. Pat. No. Re. 34,373; U.S. Pat. Nos. 4,882,286; 5,066,843; 5,206,479; 5,320,804; and 5,443,795. As generally discussed in those and related patents, the device 10 generally includes a microwave source (not shown); a waveguide (not shown) in communication with the source; a resonator (generally designated at 11 in FIG. 1) in communication with the waveguide; and a plurality of reaction vessels 12 in the resonator 11 (which is also referred to as a cavity). The reaction vessels 12 are formed of a material that is substantially transparent to microwave radiation but a poor heat conductor, with engineering polymers being the most typical materials. In general terms, engineering polymers are characterized by hardness, strength, machinability, dimensional stability, nonflammability, and resistance to corrosion, most acids, solvents, and heat. Common engineering polymers include, but are not limited to, ABS resins, fluorocarbon polymer resins, certain forms of nylon, polycarbonates, polyvinylchloride, and ureaformaldehyde resins. Appropriate materials are generally well known to those of ordinary skill in this art and will not be discussed in detail further herein. Exemplary vessels for microwave assisted chemistry are described, for example, in commonly assigned U.S. Pat. Nos. 5,369,034; 5,427,741; and 5,520,886.

Figure 2:
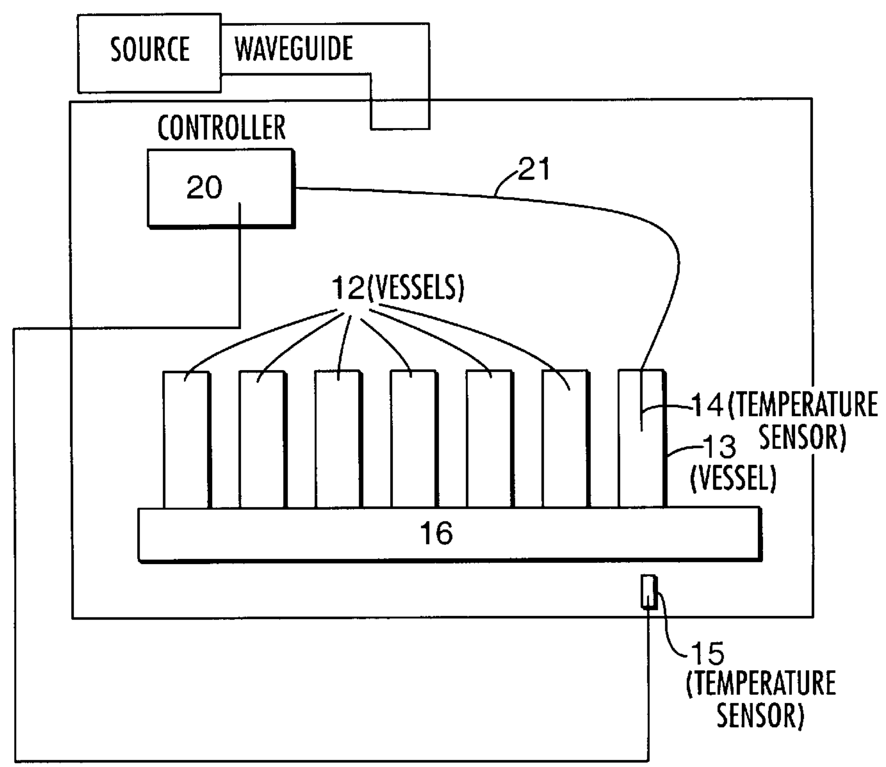
FIG. 2 is a schematic diagram of an apparatus according to the claimed invention.

FIG. 2 is a schematic diagram of the microwave device 10, and illustrates a first vessel which is designated at 13 to distinguish it from the remainder of the vessels 12. The first vessel 13 includes a first temperature sensor 14 which is inside of the first reaction vessel 13. A second temperature sensor 15 is positioned adjacent or inside the resonator 11 as FIG. 2 illustrates. Means, shown in FIGS. 1 and 2 as the turntable 16, repeatedly and successively present the exteriors of the first vessel 13 with the first temperature sensor, and thereafter the second and remaining vessels 12, to the second temperature sensor 15.

In preferred embodiments, the first temperature sensor 14 comprises a thermocouple or resistive temperature device (RTD), and the second temperature sensor 15 comprises a pyrometer that measures the black body radiation from the exterior of the vessels 12 and 13. Although the term "pyrometer" can be used to refer to a thermocouple, the term preferably applies herein to optical or radiant devices that measure temperature based on radiant energy. Although the vessels 12 can become quite hot, under normal conditions their heat radiation never reaches the visible spectrum and radiant pyrometers are thus preferred.

Certain commercially available fiber optic devices for which the fluorescence characteristics are representative of the radiant energy and temperature can also be used as either the first or second temperature sensors. See, e.g. H Kinston and S. Haswell, MICROWAVE ENHANCED CHEMISTRY, FUNDAMENTALS, SAMPLE PREPARATION AND APPLICATIONS, page 245 (1997 American Chemical Society).

The term "thermocouple" is preferably used herein to refer to temperature-measuring devices in which two wires made of dissimilar metals or semiconducting materials are joined to form a measuring junction and a reference junction from which proportional temperature differences, and thus temperatures, can be determined from the electromotive force that a temperature difference creates between the two junctions.

An RTD is an electrical device for which the resistance changes as a function of temperature. Thus, the temperature can be determined by the device resistance using known relationships among voltage, current, and resistance.

With respect to the sensor 15, FIG. 1 illustrates a representative and preferred type of turntable 16 in which the vessels are carried by circular openings that complement their own circular shape. Because portions of the top, bottom, and sides of each vessel remain exposed, the pyrometer 15 can be positioned in one or more convenient locations as may be desirable or necessary under particular circumstances. FIG. 2 illustrates a preferred embodiment in which the pyrometer 15 reads the bottom of the vessels 12 and 13, it being understood that the turntable is shown schematically in FIG. 2 and in actual practice avoids blocking the radiation from the vessels 12 and 13 to the pyrometer 15.

It will be further understood by those familiar with black body radiation and the operation of pyrometers, that an appropriate lens or other focusing system can be incorporated to enhance the accurate measurement of black body radiation from the vessels to the pyrometer 15.

FIG. 2 further illustrates that the pyrometer 15 and the thermocouple 14 can each be connected to a controller 20 by appropriate connections and circuitry designated by the single lines 17 and 21. FIG. 1 illustrates a number of device features and shows control panels 22 and 23, a power switch, a display 25 typically formed of liquid crystals (LCDs) or light-emitting diodes (LEDs), along with a specifically illustrated controller 20 and its connection to the vessels and sensors. FIG. 1 also makes specific reference to the walls 26, floor 27, and door 30 of the device 10.

The method aspects of the invention help illustrate the apparatus. In this aspect, the invention comprises a method of externally and noninvasively determining the temperatures of chemical reactions inside two or more separate closed vessels during microwave assisted chemical processes. The method comprises adding chemical reagents to the interior of two separate vessels and heating the vessels thereafter. As noted above, the preferred heating method is microwave, and essentially comprises exposing the substantially microwave transparent vessels 12 and 13 to microwave radiation which in turn tends to heat the materials inside in a generally well understood fashion.

Although the microwave radiation generally fails to heat the vessels directly, the heated reagents inside the vessels heat the vessels (albeit inefficiently) by direct conduction. Accordingly, the method next comprises concurrently measuring the temperature of the reagents inside the first (e.g., vessel 13) of the two vessels using a first temperature sensor (the thermocouple 14) inside the first vessel 13 and while measuring the temperature of the exterior of the first vessel 13 using a second temperature sensor (the pyrometer 15) positioned externally to the first vessel.

The method then comprises immediately thereafter measuring the temperature of the exterior—and preferably only the exterior—of the second and succeeding vessels 12 using the second sensor 15. It will thus be understood that by concurrently measuring the interior and exterior temperatures of one of the vessels, the temperature measured externally is a measure of the temperature inside the vessel, but as moderated by the thermal characteristics of the vessel 13.

When the next successive vessel 12 is moved adjacent to the pyrometer 15, and provided that the succeeding vessels 12 have the same heat-conductive characteristics as the vessel 13 (i.e., are the same size and formed of the same material), a generally accurate assumption can be made that the relationship between the unmonitored inside temperature of the vessel 12 and its monitored outside temperature will be the same as the relationship between the monitored inside temperature of vessel 13 and its exterior monitored temperature. Accordingly, the interior temperature of the second and succeeding vessels 12 can be calibrated by measuring their exterior temperatures in successive fashion immediately following the measurement of the interior and exterior temperatures of the first vessel 13. In other words, the temperature gradient reflecting the differences between the interior and exterior temperatures of the first vessel 13 are compared with the temperature of the exterior of the second vessel 12 to calculate the interior temperature of the second and succeeding vessels.

In order to increase the accuracy of the calibration, the method further comprises re-measuring the inside and exterior temperatures of the first vessel after measuring the exterior temperature of the second and succeeding vessels, and immediately thereafter re-measuring the exterior temperature of the second and succeeding vessels. The difference between interior and exterior temperatures for the first vessel is again used as the difference for the second and succeeding vessels so that the interior temperature of the second and succeeding vessels is repeatedly updated—calibrated—based on the two measurements that are repeatedly made in the first vessel.

As FIGS. 1 and 2 illustrate, the turntable 16 moves the vessels in a closed repeating circular path that passes adjacent the pyrometer. It will be understood that although the use of a turntable for a particular number of vessels arranged in a circle on the turntable is a convenient geometrical arrangement, the invention is not limited to particular movement in a circle.

In preferred embodiments, the vessels, including the first vessel 13 with the thermocouple 14, complete the closed path in a relatively short period of time, usually less than ten seconds and preferably even more frequently. Thus, using the method and apparatus of the invention, the interior temperatures—the reaction temperatures—of a plurality of vessels can be continuously, accurately, and precisely updated at very short intervals even as the vessels themselves change temperature because of the ongoing heated reactions inside.

In turn the ability to accurately and precisely determine reaction temperature inside the vessels in a noninvasive fashion permits the application of microwaves to be moderated or controlled in response to the temperature so as to more precisely moderate or control the chemical reactions taking place inside. As known to those familiar with microwave radiation, the moderation of the application of microwaves can take several forms including moderating the time periods during which microwaves are applied to the vessels, moderating the power level of the microwave applied, or even moderating the frequency (and thus the wavelength) of the microwaves applied to the vessel.

In the drawings and specification, there have been disclosed typical embodiments of the invention, and, although specific terms have been employed, they have been used in a generic and descriptive sense only and not for purposes of limitation, the scope of the invention being set forth in the following claims.

That which is claimed is:

1. A method of externally determining the temperatures of chemical reactions inside two separate closed vessels, the method comprising:

heating the two separate vessels containing chemical reagents therein;

concurrently measuring the temperature of the reagents inside the first of the two vessels using a first temperature sensor inside the first vessel and while measuring the temperature of the exterior of the first vessel using a second temperature sensor positioned externally to the first vessel;

immediately thereafter measuring the temperature of the exterior of the second vessel using the second sensor; and calibrating the inside temperature of the second vessel based upon the measured inside temperature of the first vessel, the measured exterior temperature of the first vessel, and the measured exterior temperature of the second vessel.

2. A temperature determination method according to claim 1 and further comprising the steps of:

remeasuring the inside and exterior temperatures of the first vessel after measuring the exterior temperature of the second vessel; and immediately thereafter remeasuring the exterior temperature of the second vessel.

3. A temperature determination method according to claim 1 wherein the step of heating the vessels comprises exposing the vessels to electromagnetic radiation in the microwave frequency range.

4. A temperature determination method according to claim 3 wherein the step of measuring the inside temperature of the first vessel comprises measuring the temperature using a thermocouple.

5. A temperature determination method according to claim 3 wherein the step of measuring the inside temperature of the first vessel comprises measuring the temperature using a resistance temperature device.

6. A temperature determination method according to claim 4 wherein the step of measuring the exterior of the first and second vessels comprises measuring the black body radiation from the exterior of the vessels using a pyrometer.

7. A temperature determination method according to claim 4 wherein the steps of measuring the inside and exterior temperatures comprises measuring the black body radiation using a fiber optic device for which the fluorescence properties change with temperature.

8. A temperature determination method according to claim 6 comprising moderating the microwave radiation based on the temperature measured by the pyrometer.

9. A method of externally determining the temperatures of chemical reactions inside a plurality of separate closed vessels that are made of materials that substantially transparent to microwave radiation but that are poor conductors of heat, the method comprising:

exposing a plurality of substantially microwave-transparent vessels containing chemical reagents therein to microwave radiation;

concurrently measuring the temperature of the reagents inside a first vessel of said plurality of vessels using a first temperature sensor inside the first vessel and while measuring the temperature of the exterior of the first vessel using a second temperature sensor positioned externally to the first vessel;

immediately thereafter successively measuring the temperature of the exterior of the remainder of the vessels using the second sensor; and calibrating the inside temperatures of the second and succeeding vessels based upon the measured inside temperature of the first vessel, the measured exterior temperature of the first vessel, and the measured exterior temperatures of the second and succeeding vessels.

10. A temperature determination method according to claim 9 and further comprising the steps of:

remeasuring the inside and exterior temperatures of the first vessel after measuring the exterior temperature of the remainder of the vessels; and immediately thereafter successively remeasuring the exterior temperature of the remainder of the vessels.

11. A temperature determination method according to claim 10 wherein the step of remeasuring the first and remaining vessels is carried out while continuing to expose the vessels to the microwave radiation.

12. A temperature determination method according to claim 11 wherein the step of measuring the interior temperature comprises measuring the temperature with a thermocouple or a resistance temperature device, and the step of measuring the exterior temperature comprises measuring the black body radiation from the exterior with a pyrometer or a fiber optic device.

13. A temperature determination method according to claim 11 further comprising moderating the microwave radiation to which the vessels are exposed based upon the temperatures measured from the exterior of the vessels.

14. A temperature determination method according to claim 13 wherein the step of moderating the microwave radiation comprises moderating the time during which microwaves are applied to the vessels.

15. A temperature determination method according to claim 13 wherein the step of moderating the microwave radiation comprises moderating the power of the microwaves applied to the vessels.

16. A temperature determination method according to claim 13 wherein the step of moderating the microwave radiation comprises moderating the frequency of the microwaves applied to the vessels.

17. A temperature determination method according to claim 12 wherein the step of successively measuring the exterior temperatures comprises moving the vessels in a closed path that passes adjacent the pyrometer.

18. A temperature determination method according to claim 17 wherein the step of moving the vessels in a closed path comprises moving the vessels in a circle.

19. A temperature determination method according to claim 9 and further comprising the step of adding chemical reagents to the vessels prior to the step of heating the vessels.

20. A system for externally determining the interior temperatures of a plurality of closed vessels that are formed of materials that are generally poor conductors of heat from their interior portions to their exterior surfaces, said system comprising:

a microwave source;

a waveguide in communication with said source;

a resonator in communication with said waveguide;

a plurality of reaction vessels in said resonator, said vessels being formed of a material that is substantially transparent to microwave radiation but a poor heat conductor;

a first temperature sensor inside one of said reaction vessels;

a temperature sensing means for successively measuring the temperature of the exterior of said reaction vessels and being located adjacent said resonator and external to all of said reaction vessels; and means for repeatedly and successively presenting the exteriors of said vessel with the first temperature sensor and said remaining vessels to said external temperature sensing means.

21. A temperature determination system according to claim 20 wherein said first temperature sensor is selected from the group consisting of thermocouples and resistance temperature devices and said temperature sensing means is selected from the group consisting of pyrometers and fiber optic devices.

22. A temperature determination system according to claim 21 wherein said presenting means comprises a turntable that carries said vessels in a generally circular path in said resonator and past said temperature sensing means.

23. A temperature determination system according to claim 22 wherein said vessels are formed of a polymer.

24. A temperature determination system according to claim 23 and further comprising means for controlling the microwave source based upon the exterior temperatures measured by said temperature sensing means.

25. A temperature determination system according to claim 20 wherein all of said vessels are the same size and are formed of the same material.

* * * * *